United States Patent
Marmonier et al.

(10) Patent No.: US 6,538,875 B2
(45) Date of Patent: Mar. 25, 2003

(54) HYBRID HIGH-VOLTAGE SUBSTATION HAVING BUSBARS THAT ARE ENCLOSED IN METAL CLADDING AND A BACKUP PHASE THAT IS AIR INSULATED

(75) Inventors: Jean Marmonier, Aix les Bains (FR); Jean-Paul Audren, Saint Offenge Dessus (FR)

(73) Assignee: Alstom, Paris (FR)

( * ) Notice: Subject to any disclaimer, the term of this patent is extended or adjusted under 35 U.S.C. 154(b) by 0 days.

(21) Appl. No.: 09/885,131

(22) Filed: Jun. 21, 2001

(65) Prior Publication Data

US 2002/0015280 A1 Feb. 7, 2002

(30) Foreign Application Priority Data

Jun. 23, 2000 (FR) .............................. 00 08120

(51) Int. Cl.[7] ................................. H02B 5/04
(52) U.S. Cl. .................. 361/602; 361/601; 361/602; 307/147
(58) Field of Search ................. 361/601, 602, 361/603, 611, 620, 622, 605–607, 623, 641; 307/142, 147, 148; 200/48 A, 48 R; 218/75, 143, 155–157

(56) References Cited

U.S. PATENT DOCUMENTS

| | | | |
|---|---|---|---|
| 3,697,819 A | * 10/1972 | Eichelberger et al. | 317/103 |
| 4,884,166 A | * 11/1989 | Thuries et al. | 361/333 |
| 5,648,888 A | * 7/1997 | Francois et al. | 361/603 |
| 5,715,134 A | * 2/1998 | Maineult et al. | 361/604 |
| 6,195,253 B1 | * 2/2001 | Fahlgren et al. | 361/603 |
| 6,233,137 B1 | * 5/2001 | Kolos et al. | 361/603 |

FOREIGN PATENT DOCUMENTS

| | | | |
|---|---|---|---|
| DE | 35 30 644 A | 3/1987 | |
| JP | 02000050430 A | * 2/2000 | H02B/5/00 |

* cited by examiner

Primary Examiner—Darren Schuberg
Assistant Examiner—Michael Datskovsky
(74) Attorney, Agent, or Firm—Sughrue Mion, PLLC

(57) ABSTRACT

The hybrid high-voltage substation comprises firstly equipment implemented using metal-clad technology and constituted by at least one single or double busbar set, and secondly equipment implemented using conventional air-insulated technology so as to form feeders disposed in bays approximately perpendicular to said busbar set. The substation incorporates at least one air-insulated backup line approximately parallel to the busbar set and performing the function of backup phase to enable the substation to operate in "degraded" manner.

10 Claims, 7 Drawing Sheets

HYBRID HIGH-VOLTAGE SUBSTATION HAVING BUSBARS THAT ARE ENCLOSED IN METAL CLADDING AND A BACKUP PHASE THAT IS AIR INSULATED

The invention relates to a hybrid high-voltage substation having busbars and disconnectors that are enclosed in metal cladding and insulated with gas using metal-clad and gas-insulated technology, and its other equipment that is insulated with air using conventional air-insulated technology. More particularly, the invention relates to an improvement to that type of substation, consisting in adding a backup phase using conventional air-insulated technology, so as to make it possible to reduce significantly the time for which the substation is unavailable while work is being done on the busbars. It should be noted that the abbreviation GIS (for "Gas-Insulated System") is commonly used to designate metal-clad and gas-insulated technology applied to "metal-clad" switchgear, and that the abbreviation AIS (for "Air-Insulated System") designates air-insulated technology.

BACKGROUND OF THE INVENTION

By way of introduction, the concept of a "hybrid" substation should be explained, because it is relatively recent. The main aim is to reduce the ground area occupied by conventional AIS substations, while retaining both the advantages of AIS technology in terms of cost and of the ease with which components can be replaced, and also the advantages of GIS technology in terms of compactness and of insensitivity to pollution.

It should be recalled that the drawbacks of GIS technology as compared with AIS technology are mainly that costs are higher, and that maintenance and extension are more complex, which means that the substation can be unavailable for as long as a few days. The advantages of GIS technology over AIS technology are mainly that it offers greater compactness, and insensitivity to pollution, in particular at the busbars. In addition, in order to clean the insulators of a GIS substation, it is generally necessary merely to isolate each bay in turn, whereas in order to clean the insulators of the busbars of an AIS substation, it is necessary to isolate all of the busbars.

Forming a hybrid substation consists in progressively replacing GIS-technology equipment with AIS-technology equipment of equivalent function, starting from the equipment situated in the vicinity of an overhead feeder and going towards the busbars. The optimum configuration that satisfies the above-mentioned objectives consists firstly in equipping the substation with metal-clad (GIS) busbars and disconnectors, and secondly in using conventional AIS technology for the remainder of the equipment.

That technical solution procures most of the advantages of metal-clad switchgear and of air-insulated switchgear, without suffering from their respective drawbacks.

In order to optimize ground area occupancy, the Applicant has designed an architecture making it possible to receive the busbars under a central gantry that can serve as a line-stop gantry for feeders on the same side of the gantry. The advantage of such architecture over a conventional assembly using all-AIS technology appears in FIG. 1, in which it can be observed that it is possible to omit the conventional line-stop gantry since it is unnecessary in a hybrid GIS/AIS system. A configuration that has directly mutually opposite feeders, and that is particularly advantageous in terms of ground area used, has also been designed by the Applicant, and is shown in FIG. 4.

However, such hybrid GIS/AIS systems do suffer from drawbacks as compared with systems using conventional all-AIS technology. In particular, when performing maintenance on a metal-clad double busbar set, it is often necessary to de-energize two busbars assigned to the same phase, thereby making the substation unavailable for three to four days on average, because of the complexity of the work on GIS-technology equipment. Firstly, for some types of work, it is essential to de-energize two busbars having the same phase, in particular when doing maintenance on a selector switch disconnector for said two bars. During the work, it is necessary to empty the gas that insulates the compartments of the disconnector and of the feedthrough. Secondly, for other types of work, it is not absolutely essential to de-energize simultaneously the two busbars of the same phase, such other types of work being, for example, extending a busbar set, or adding new metal-clad compartments successively in alignment with existing compartments. The busbars to be extended may be isolated (de-energized) one at a time by the selector switch disconnectors, thereby making it possible to keep the substation in service while the work is being done. However, when performing such work, it is often preferred for both busbars to be completely isolated rather than de-energizing a single busbar only, in order to maximize safety.

Thus, working on metal-clad busbars in a hybrid substation most often involves isolating two busbars of the same phase, thereby making the entire substation unavailable.

OBJECTS AND SUMMARY OF THE INVENTION

An object of the invention is to reduce significantly the time for which a hybrid substation is unavailable when working on metal-clad equipment.

To this end, the invention provides a high-voltage substation comprising firstly equipment implemented using metal-clad technology and constituted by at least one single or double busbar set, and secondly equipment implemented using conventional air-insulated technology so as to form feeders disposed in bays approximately perpendicular to said busbar set, said high-voltage substation incorporating at least one air-insulated backup line approximately parallel to the busbar set and performing the function of backup phase to enable the substation to operate in "degraded" manner.

In a preferred embodiment, each backup line may replace any one of the phases of the busbar set while work is being done a metal-clad element of the substation.

In a preferred embodiment, each backup line is de-energized while no work is being done on any metal-clad element of the substation.

In a preferred embodiment, each backup line is provided with connection elements, each of which is assigned to a respective phase of the feeder that it overlies, and is suitable for being connected to its respective phase via an electrical link element.

In a preferred embodiment, a single backup line is installed on either side of the busbar set. Since an incident in the metal-clad portion of a substation generally concerns a single phase only (each of the three phases is conveyed in a respective independent volume), the backup line may be constituted by a single phase only, thereby considerably reducing cost and considerably increasing compactness.

BRIEF DESCRIPTION OF THE DRAWINGS

The invention, its characteristics, and its advantages are made clearer in the following description given with reference to the figures listed below.

MORE DETAILED DESCRIPTION

Figure 1:
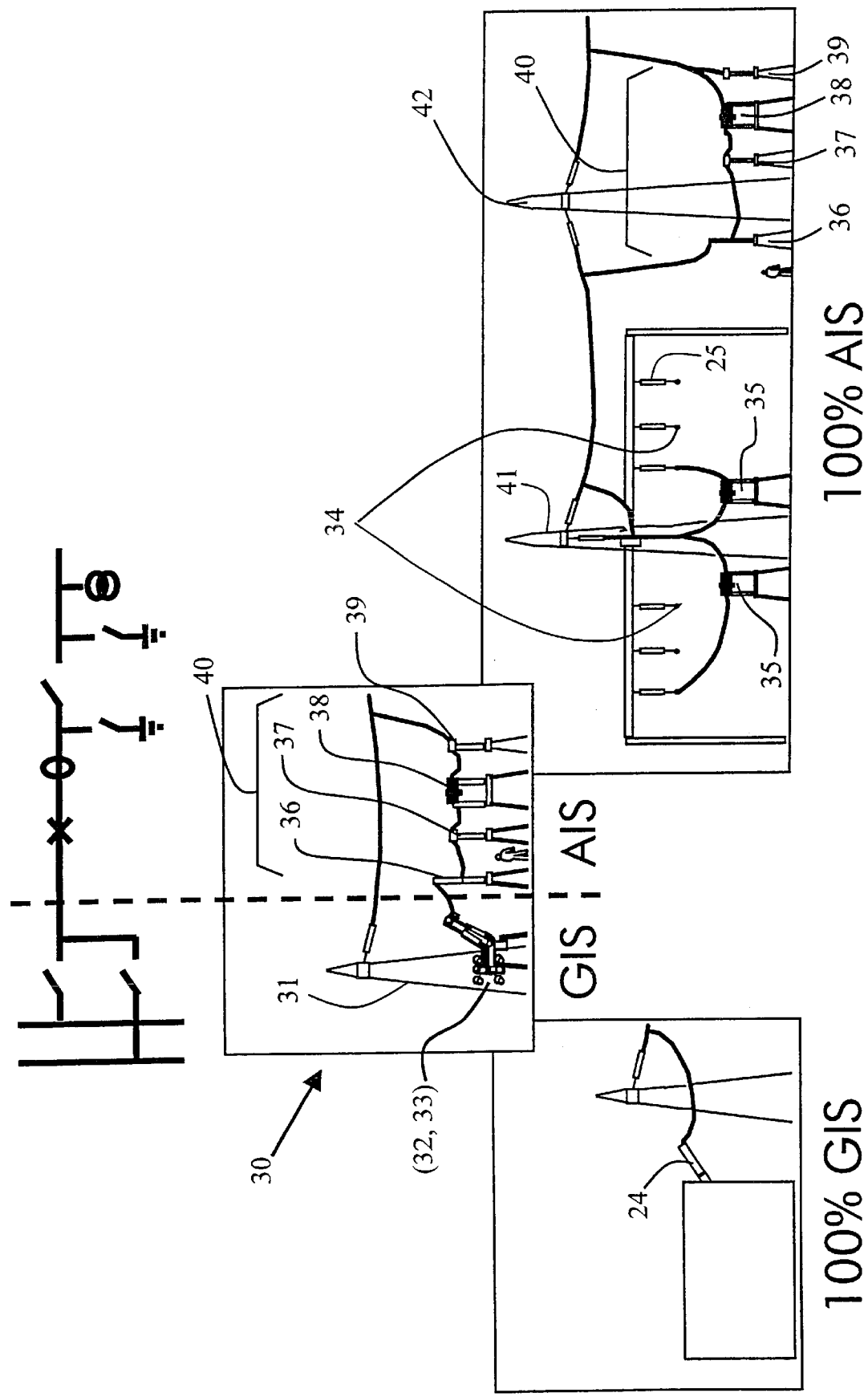
FIG. 1 shows an advantageous configuration of a hybrid AIS/GIS substation designed by the applicant, as compared with an all-GIS configuration and with a conventional all-AIS configuration.

FIG. 1 shows a hybrid (GIS/AIS) substation 30 that is equipped with a three-phase double busbar set 32 and selector switch disconnectors 33 enclosed in metal cladding, said disconnectors not being visible in the figure because they are disposed between the two busbar sets. Each set of three metal-clad busbars is disposed horizontally under a line-stop gantry 31. The remainder of the equipment forms a feeder 40 proper and is implemented using conventional AIS technology. In such a feeder, the AIS equipment typically comprises, in series, a circuit-breaker 36, a current transformer 37, a line grounding disconnector 38, and a voltage transformer 39. The all-AIS substation comprises a three-phase double busbar set 34 made up of a pair of sets of three air-insulated busbars disposed on either side of a gantry 41. Two selector switch disconnectors 35 are used per phase for a feeder 40 which, in this example underlies a conventional line-stop gantry 42.

It appears clearly that, for a conventional all-AIS configuration, the ground area occupied by the double busbar set 34 is greater than the ground area occupied by a feeder 40.

The diagram at the top of the figure is a symbolic equivalent circuit diagram of a full substation installation. From left to right, the following are shown: the symbols for a double busbar set with selector switch disconnectors, a circuit-breaker, a current transformer, a line grounding disconnector, and a voltage transformer.

Figure 2:
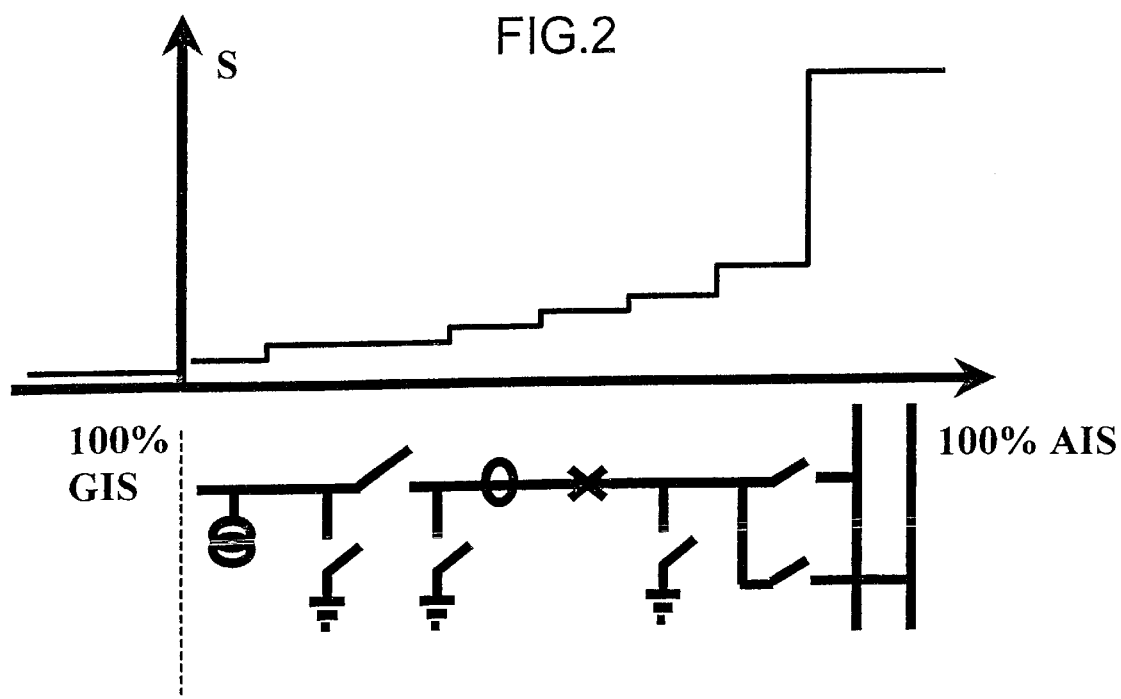
FIGS. 2 and 3 shows the effects of progressively going from an all-GIS technology to an all-AIS technology, in terms of ground area occupied (FIG. 2) and in terms of number of isolations for maintenance purposes (FIG. 3)

FIG. 2 shows, plotted up the y-axis, the variation in the ground area S occupied by the substation when going progressively from an all-GIS substation to an all-AIS substation, by successively replacing the following elements whose symbols are shown at the bottom of the graph: potential transformer, double grounding disconnector, current transformer, circuit-breaker, grounding disconnector, and double bus bar set with selector switch disconnectors. This graph verifies what can be observed in FIG. 1, namely that the ground area occupied by the substation increases strongly when the selector switch disconnectors go over to conventional AIS technology.

Figure 3:
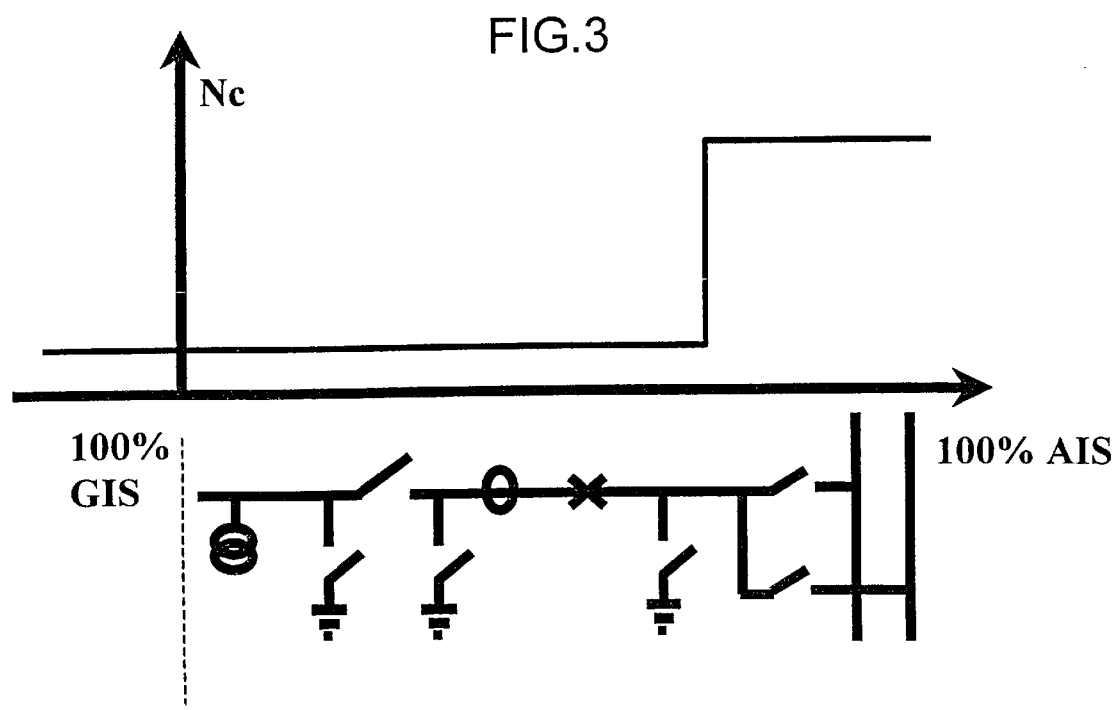

FIG. 3 shows, plotted up the y-axis, the variation in the number Nc of isolations necessary when cleaning the insulators of a substation, when going progressively from an all-GIS substation to an all-AIS substation, as described with reference to FIG. 2. Nc is representative of the loss of continuity of service of the busbar set(s) during insulator cleaning. The work to clean the insulators of the overhead feedthroughs 24 on GIS equipment does not require a busbar set to be de-energized, unlike on AIS equipment for which it is necessary to isolate the busbar sets 34 in order to work on the insulators 25 (the elements 24 and 25 are shown in FIG. 1). A strong increase in the number of isolations is thus inevitable when the busbar sets 32 and the selector switch disconnectors 33 go over to conventional AIS technology.

These graphs justify the choice adopted for the advantageous configuration of a hybrid substation 30 as shown in FIG. 1.

Figure 4:
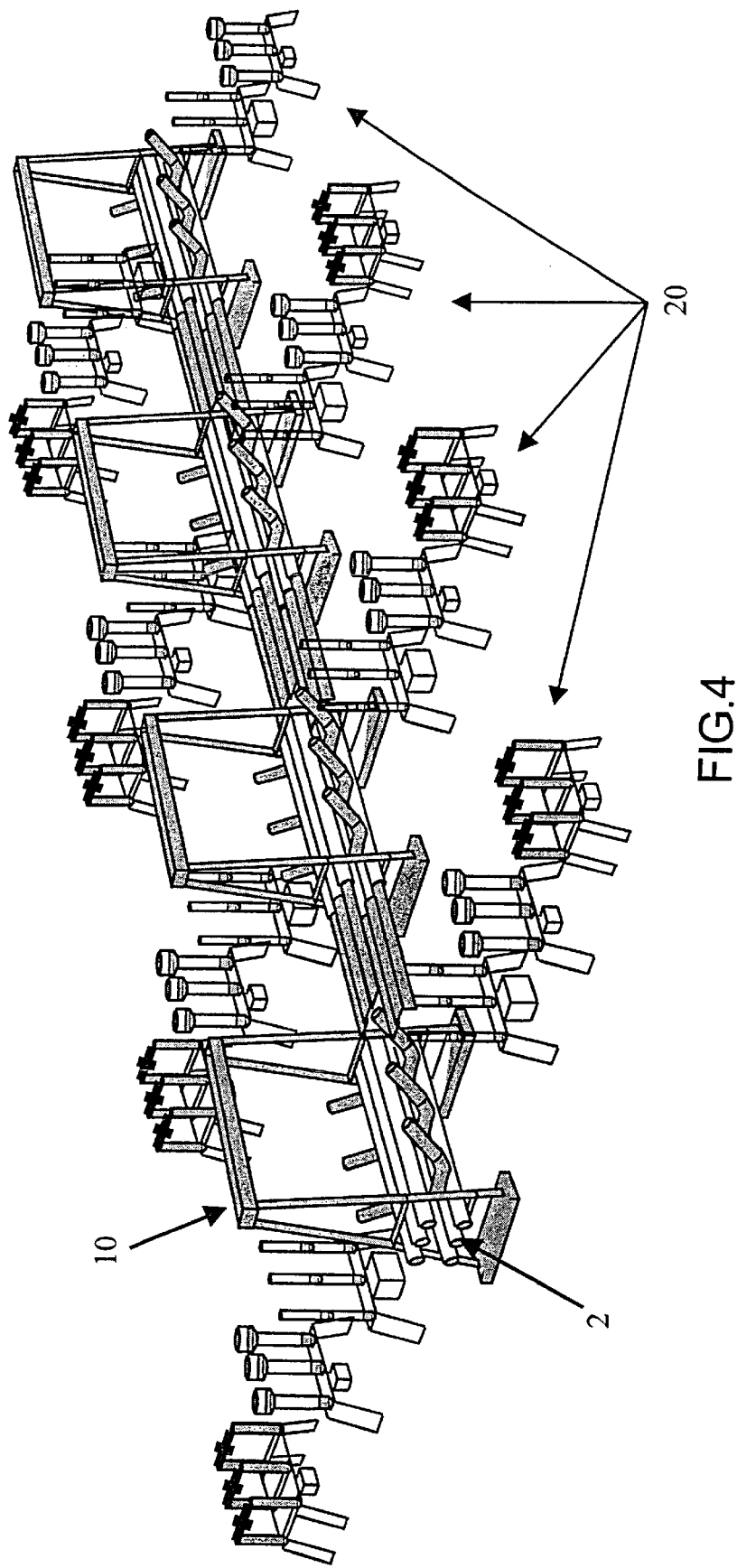
FIG. 4 is a perspective view of a layout for a three-phase double-busbar hybrid substation designed by the Applicant, with directly opposite feeders.

In FIG. 4, the feeders are directly mutually opposite and they are disposed in bays 20 perpendicular to the busbar set 2. Such an opposite feeder configuration is particularly advantageous in terms of ground area occupied because the central gantry 10 performing the function of line-stop gantry may be used in common for two feeders. The length of such a substation is halved compared with a conventional AIS technology substation because the feeders can be implemented to be directly mutually opposite. It can be noted that this type of substation is modular, each of the elementary modules having two opposite feeders in this example. Naturally, other configurations may be implemented on the basis of this modular principle, e.g. a configuration in which each elementary module has only one feeder and in which all of the feeders are on the same side of the busbar set.

Figure 5:
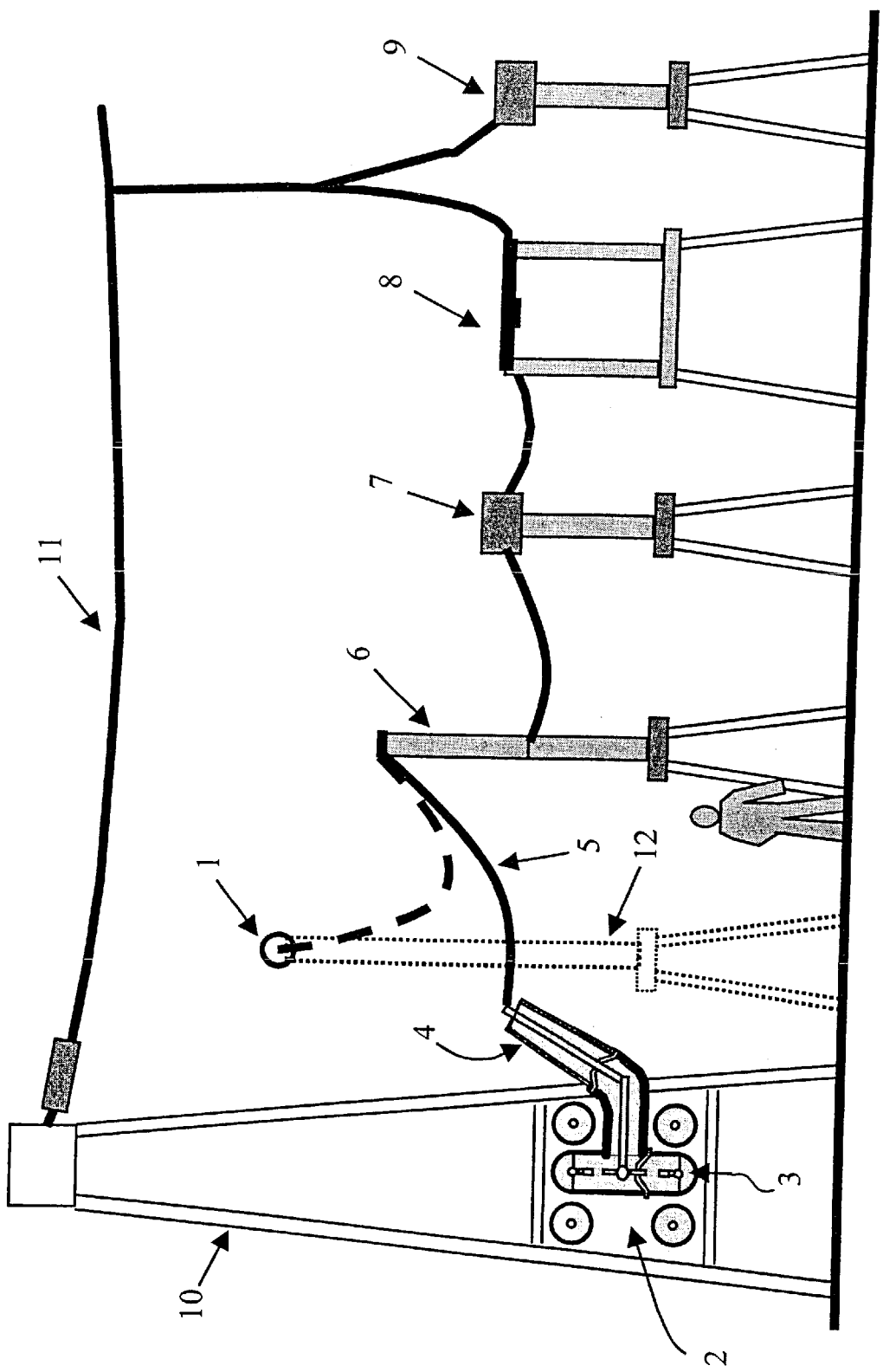
FIG. 5 is a section view of one phase of a three-phase feeder for a hybrid substation of the invention having a busbar providing a backup phase function.

FIG. 5 shows a backup line 1 made up of busbars or cables using conventional AIS technology and installed in the substation. A single line 1 is present per feeder in the embodiment shown. This line is positioned substantially parallel to the GIS-technology busbar set 2. A single feeder is shown, but it should be understood that the hybrid substation may have opposite feeders such as those shown in FIG. 4. The substation has a single busbar 1 per feeder, which busbar can serve as a backup phase when any one of the phases of the busbar set 2 has been isolated, for the purpose of providing "degraded" operation. Such degraded operation makes it possible to repair the busbar set or one of its overhead feedthroughs 4, or to extend it, while reducing considerably for each repair or extension operation the unavailability time as compared with a hybrid substation that does not have a backup phase. A line-stop gantry 10 makes it possible to anchor the line feeder cables 11 and is advantageously used to support a three-phase double busbar set 2. The compartments of two busbars assigned to the same phase are connected together conventionally by selector switch disconnectors 3, each of which opens out onto an overhead feedthrough 4. A perspective view of an electrical circuit diagram of the double busbar set 2 is given in FIG. 8. Each overhead feedthrough 4 corresponds to a given phase, and it is connected to the AIS-technology elements of the same phase via an electrical link element 5 that may be constituted merely by a cable. In the example shown, this link element is fixed permanently to a circuit-breaker 6 associated in series with a current transformer 7 and with a line grounding disconnector 8. A voltage transformer 9 may also be connected to the potential of the cable 11 fed by the feeder. The busbar 1 is assumed in this example to be supported by an insulating column 12 and to be placed at a sufficient isolation distance from the cable 11 and from the gantry 10. When the substation is operating normally, the overhead feedthrough 4 is connected to the circuit-breaker 6 via the link element 5, and the busbar 1 is preferably de-energized. If work is necessary on one or two compartments of the same phase as the present section in the busbar set, the link element 5 is disconnected from the overhead feedthrough 4 so as to be connected to the bar 1 via a connection element 13 shown in FIG. 6, this applying for the same phase in all of the feeders of the substation. Said compartments are preferably isolated prior to the disconnection for safety reasons, but energized disconnection remains possible. The busbar 1 is then energized from another substation, with the same phase as the phase isolated in the defective substation, which makes it possible to cause said substation to be operated in degraded mode after it has been unavailable for a time typically of about one hour only. Such degraded operation must be provided throughout the work on the portion of the substation that is enclosed in metal cladding, typically for about three to four days. When the phase isolated at the busbar set is energized again after the work has been done, the substation can be returned to its normal operating mode by reconnecting, bay-by-bay the link element 5 to the overhead feedthrough 4. The operation is said to be in "degraded mode" because it does not offer the same dependability of continuity in supply as in normal operating mode. In particular, when a single backup line 1 is installed per feeder, any insulation fault occurring on the line 1 will result in all of the feeders being isolated, regardless of whether the substation has single or double busbar sets. The invention is not however limited to a single backup phase, and a plurality of backup lines (busbars or cables) may be installed per feeder in order to make it possible firstly for degraded operation to take place while work is being done simultaneously on a plurality of phases of the busbar set, and secondly for maximum dependability to be provided in the event that a malfunction occurs on one of the backup lines. However, on the date of filing the application, the Applicant considers that a single backup line is preferable in most cases for reasons of compactness and of cost, in view of the fact that, statistically, operation in degraded mode of the invention is a priori very rarely necessary, and doubtless less than once per year and per substation.

Figure 6:
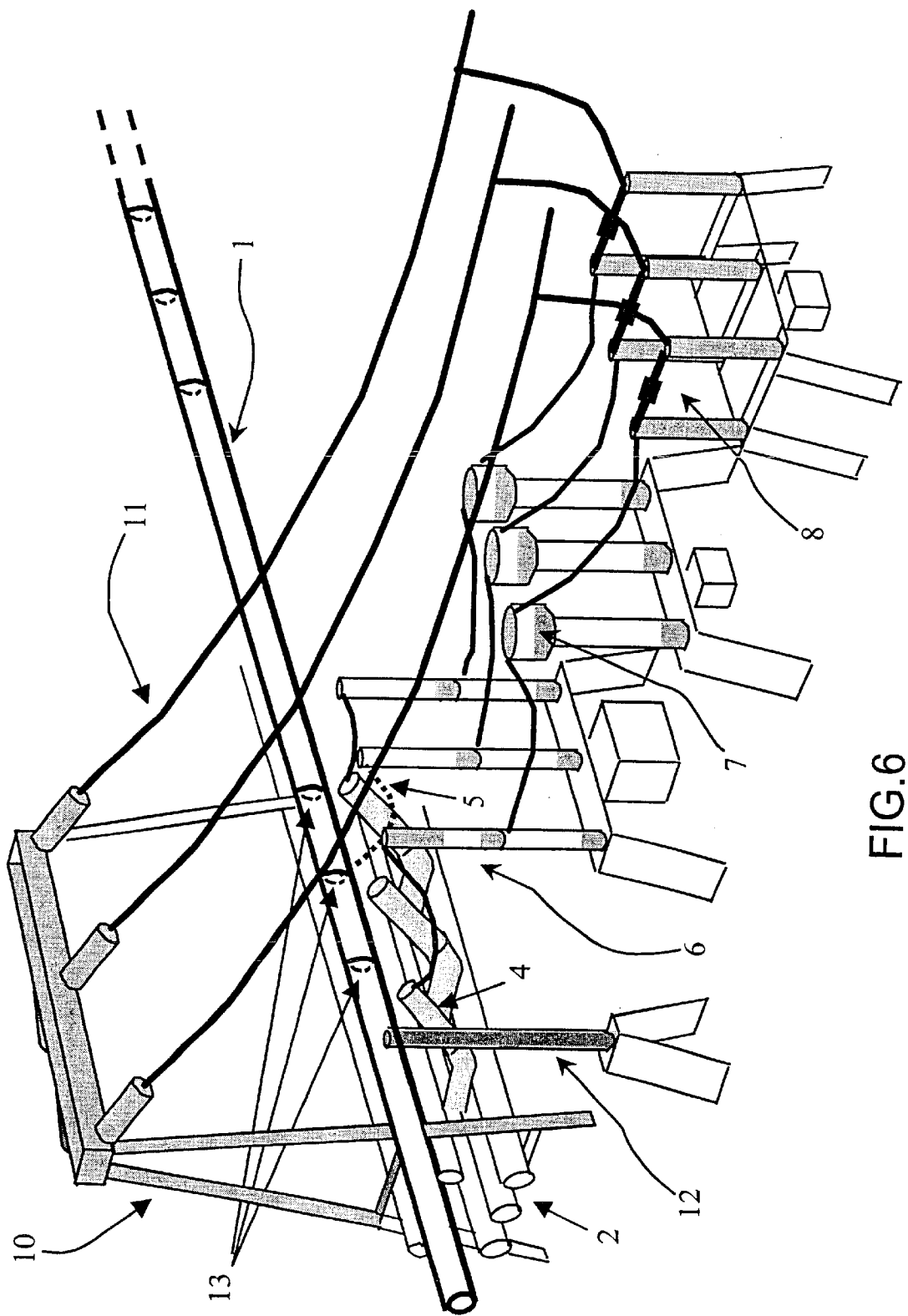
FIG. 6 is a perspective view of a three-phase feeder of a hybrid substation having a backup phase as shown in FIG. 5.

In FIG. 6, the phase in the middle of this perspective view is identical to the phase shown in section in FIG. 5. The diameter of the busbar 1 as shown is larger than it would be if it were drawn to scale, so as to show up the three connection elements 13 of the feeder that are fixed to said busbar and that are mentioned above. When a link element 5, e.g. the link element shown in dashed lines for the middle phase, is connected for each of the feeders of the substation to the busbar 1, the substation can operate in degraded mode.

Figure 7:
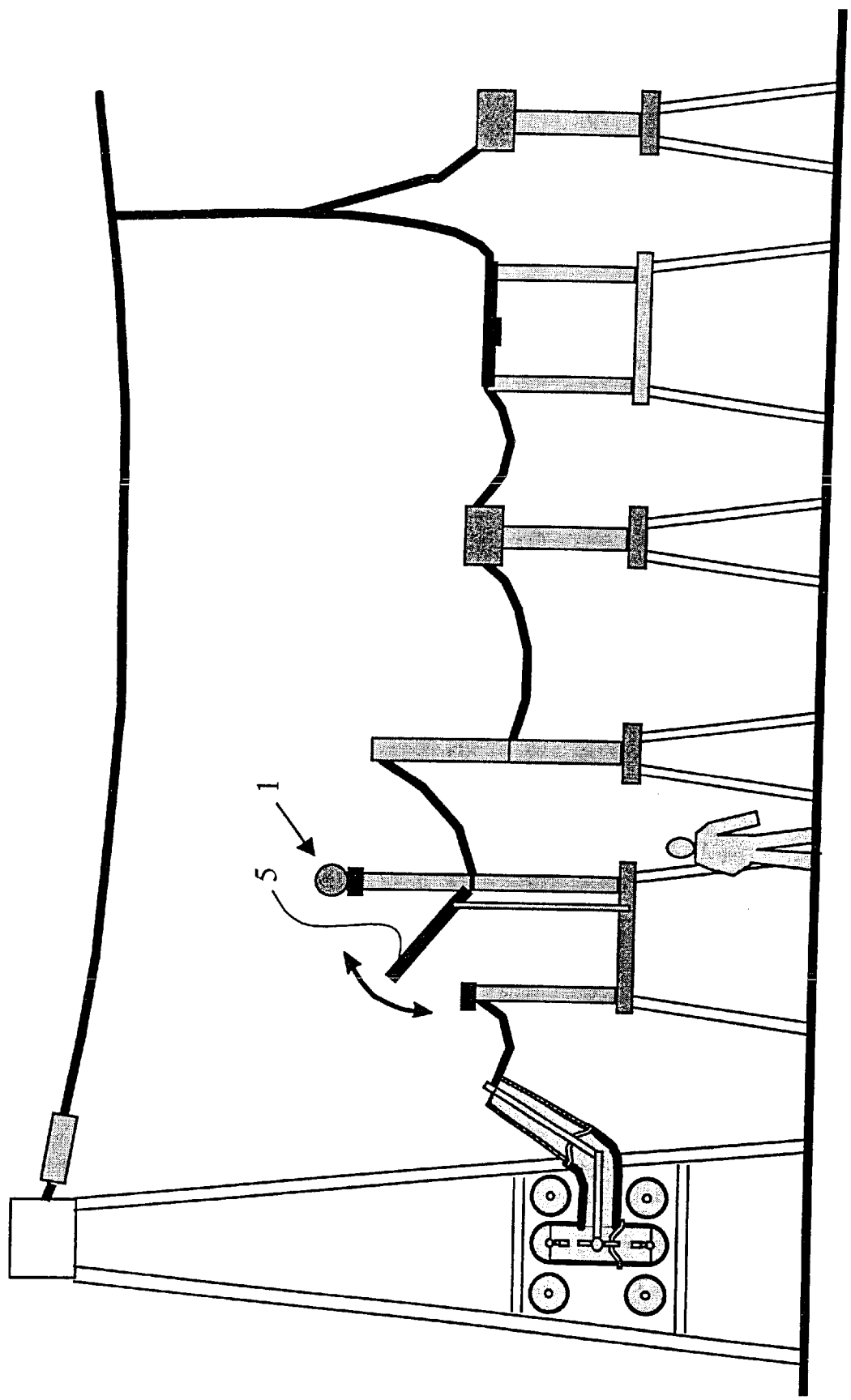
FIG. 7 is a view analogous to the view in FIG. 5, and in which the backup phase is connected by a disconnector having a pivotally-mounted arm.

In FIG. 7, the connection element 5 is constituted by the pivotally-mounted arm of a disconnector controlled in single-pole manner either electrically or by a crank handle, thereby reducing the time for which the substation is unavailable prior to going over to the degraded operating mode.

Figure 8:
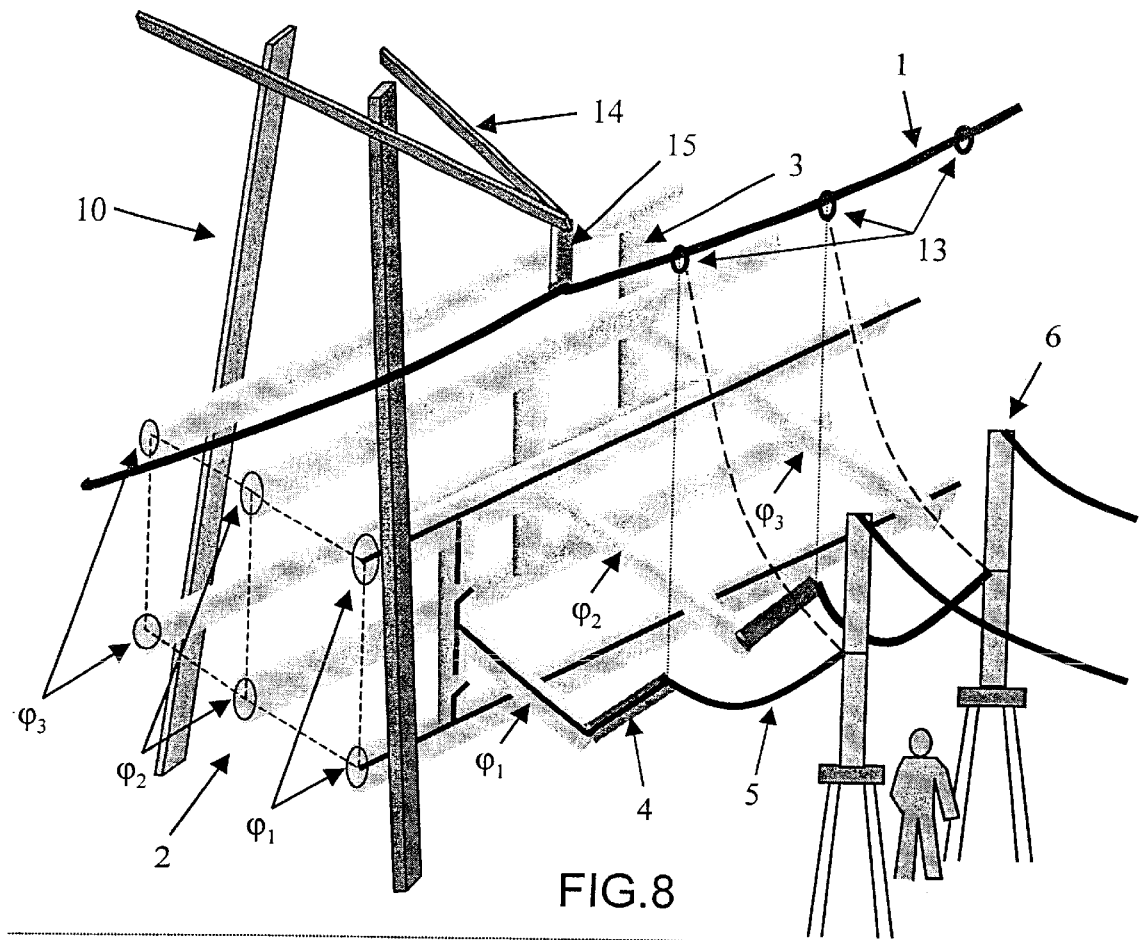
FIG. 8 is a fragmentary perspective view of a three-phase feeder of a hybrid substation of the invention, with an enlarged out-of-scale view of the double bus bar set.

In FIG. 8, the double busbar set 2 is diagrammatically shown with the busbars being spaced widely apart on a scale disproportionate to the scale on which the gantry 10 and the circuit-breakers 6 are shown. This makes it possible to understand the typical configuration of the selector switch disconnectors 3 assigned to the three phases $\phi_1$, $\phi_2$, and $\phi_3$, which are shown here only for the feeders on the same side of the busbar set. An electrical circuit diagram of the internal conductors of the busbars, of the selector switch disconnector shown in the double open position, and of the overhead feedthrough 4 is shown for the phase $\phi_1$.

In a preferred embodiment, the selector switch disconnectors are doubled conventionally so as to feed opposite feeders, and the backup line 1 is constituted by a cable suspended from a bracket 14 on each gantry 10 via an insulator 15. This configuration makes it possible to reduce the costs and the ground area occupied compared with an equivalent embodiment shown in FIG. 5, because it is not necessary to install a support system with its frame on the ground. As shown in FIG. 6, each of the connection elements 13 fixed to the line 1 is preferably situated in a vertical plane including the link element 5 that is assigned to it.

Figure 9:
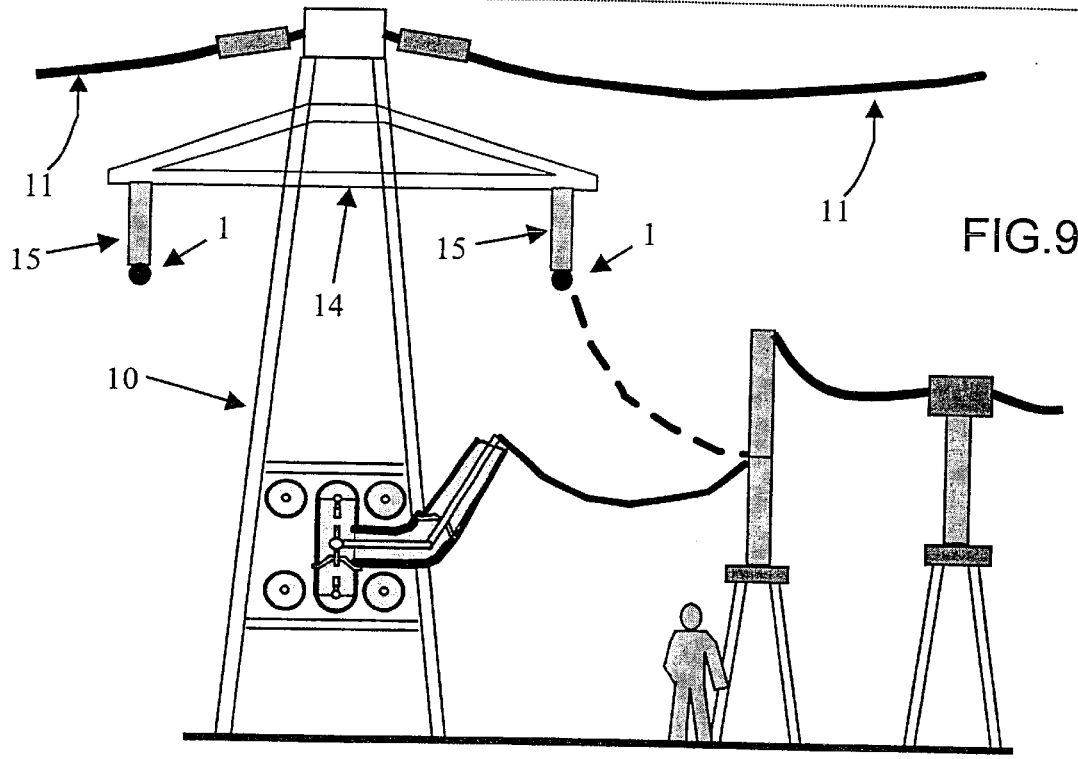
FIG. 9 is a fragmentary section view of one phase of a hybrid substation as shown in FIG. 8.

FIG. 9 is a fragmentary view in section of the phase $\phi_2$ of the substation feeder shown in FIG. 8. The feeder situated on the left of the busbar set is not shown because it is substantially symmetrical to the right feeder about the gantry 10.

What is claimed is:

1. A high-voltage substation comprising firstly equipment implemented using metal-clad technology and constituted by at least one single or double busbar set, and secondly equipment implemented using conventional air-insulated technology so as to form feeders disposed in bays approximately perpendicular to said busbar set, said high-voltage substation incorporating at least one air-insulated backup line approximately parallel to the busbar set and performing the function of backup phase to enable the substation to operate in "degraded" manner.

2. A substation according to claim 1, in which each backup line may replace any one of the phases of the busbar set while the substation is operating in degraded manner.

3. A substation according to claim 2, in which each backup line is de-energized while the substation is operating normally.

4. A substation according to claim 3, in which each backup line is provided with connection elements each of which is assigned to a respective phase of the feeder that it overlies, and is suitable for being connected to its respective phase via an electrical link element.

5. A substation according to claim 4, in which, for normal operation of the substation, the electrical link element of any given phase is connected to an overhead feedthrough electrically connected to the same phase of the busbar set, and, for degraded operation, said electrical link can be disconnected from said overhead feedthrough so as to be connected to the connection element assigned to said phase.

6. A substation according to claim 4, in which connecting a phase of a bay to the connection element that is assigned to it is performed by a selector switch disconnector controlled in single-pole manner and supporting the backup line to which said element is fixed.

7. A substation according to claim 1, in which a single backup line is installed on either side of the busbar set.

8. A substation according to claim 1, in which at least one backup line is made up of segments, each of which comprises a busbar supported by at least one insulating support.

9. A substation according to claim 1, in which at least one backup line is made up of segments, each of which comprises a cable supported by at least one bracket fixed to the gantry overlying the busbar set.

10. A substation according to claim 1, in which a central gantry receives the busbar set and serves as a line stop for the feeders disposed opposite one another on either side of said gantry.

* * * * *